United States Patent Office 2,772,115
Patented Nov. 27, 1956

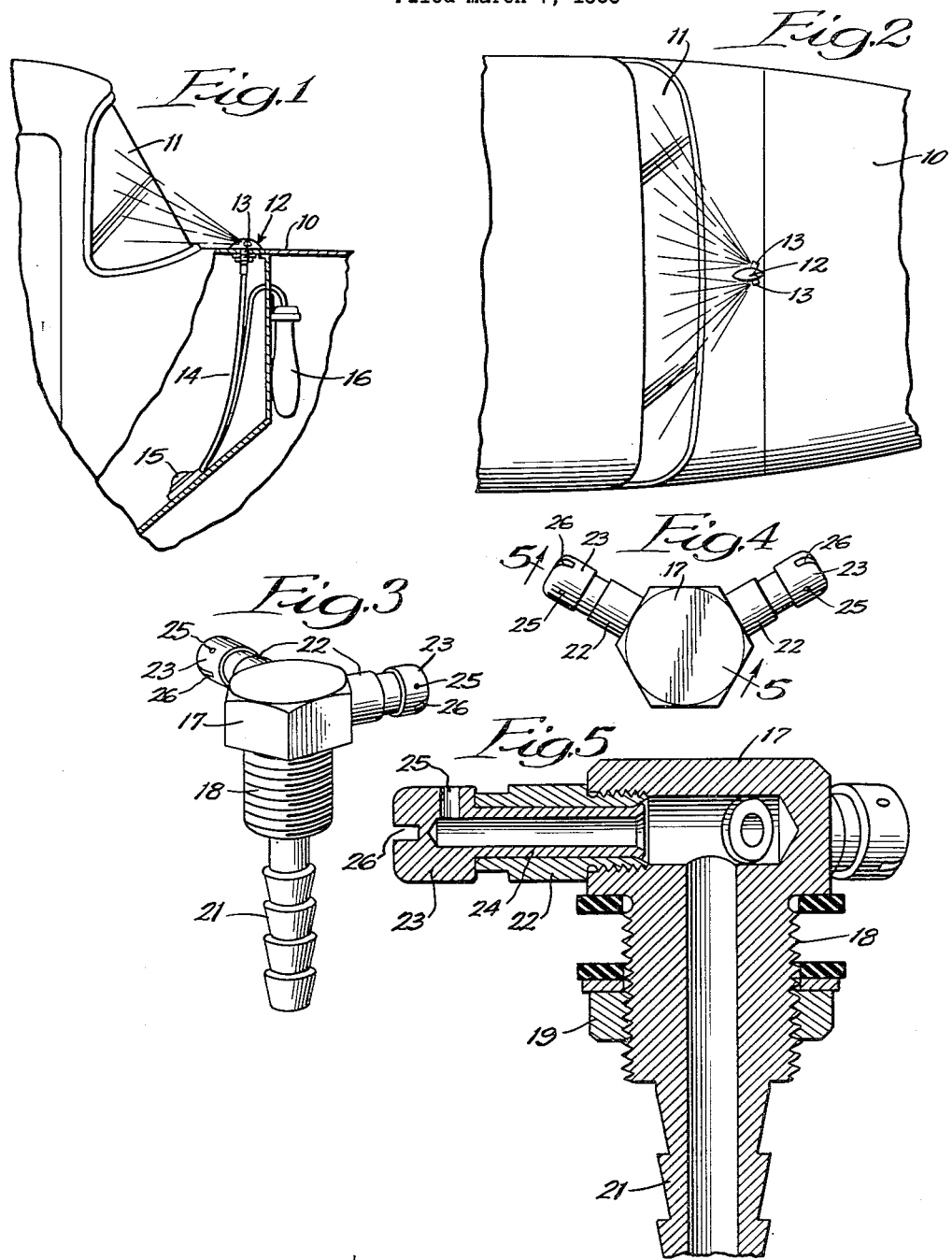

2,772,115

WINDSHIELD WASHER NOZZLE

Alfred W. Stanley, Chicago, Ill., assignor to Santay Corporation, Chicago, Ill., a corporation of Illinois Application March 7, 1955, Serial No. 492,713

2 Claims. (Cl. 299—73)

This invention relates to a windshield washer nozzle and more particularly to a nozzle to be mounted on an automobile adjacent to the windshield to direct cleaning liquid onto the windshield.

Windshield washer nozzles to be satisfactory must be adjustable so that they will direct the stream of cleaning liquid properly onto the windshield. Constructions have commonly been made for this purpose in one of which the nozzle discharge port is formed in a split ball adjustably mounted in a holder. This construction while satisfactory is relatively expensive and is somewhat difficult to adjust.

In another commercial construction, the nozzle has been formed in two parts threaded together with the discharge port in the side of the outer part. To adjust this nozzle it has been necessary to increase or decrease the thickness of shims or washers between the two parts and this is a somewhat troublesome operation.

It is accordingly one of the objects of the present invention to provide a windshield washer nozzle which is extremely simple and inexpensive in construction and which can easily be adjusted to any one of an infinite number of positions.

Another object is to provide a windshield washer nozzle in which the nozzle tube proper is rotatably mounted in a tubular base for free turning and is held in the base by an enlarged or flared portion at the end of the nozzle.

According to one feature, the nozzle is formed with an enlarged head seating against the outer end of the base and formed with a lateral discharge port and a screw driver slot in its end by which the nozzle can be angularly adjusted in the base.

The above and other objects and features of the invention will be more readily apparent from the following description when read in connection with the accompanying drawing, in which:

Figure 1 is a partial side elevation with parts broken away of an automobile equipped with a windshield washer nozzle embodying the invention;

Figure 2 is a partial plan view of the automobile;

Figure 3 is a perspective view of the nozzle support;

Figure 4 is a top plan view of the nozzle support with the nozzles assembled therein; and Figure 5 is an enlarged section on the line 5—5 of Figure 4.

The nozzle structure of the present invention is adapted to be mounted on the cowl of an automobile as indicated at 10 in Figures 1 and 2 centrally positioned in front of the windshield shown at 11. The nozzle structure is indicated generally at 12 and carries two projecting nozzles 13 which will direct streams of liquid onto opposite sides of the automobile windshield. The liquid may be supplied to the nozzle structure through a tube 14 leading from a foot operated pump 15 which receives liquid from a container 16 supported by the automobile dash.

The nozzle structure of the present invention comprises a hollow supporting base having a hexagonal head 17, a threaded shank 18 to extend through an opening in the automobile cowl and to receive a fastening nut 19 for securing the support to the cowl. The support terminates in a tubular serrated shank portion 21 onto which the tube or hose 14 may be fitted.

The hollow head 17 is drilled through two flat surfaces of the hexagonal head which are spaced from each other, as best seen in Figure 4, and the openings are threaded to receive the threaded ends of tubular bases 22. The bases, as best seen in Figure 5, have enlarged central portions which may be gripped by a wrench or similar tool for threading them into the openings securely so that the liquid cannot leak past them.

Each base rotatably supports a nozzle which is provided with an enlarged head 23 to fit against the outer end of the base and a tubular shank portion 24 extending rotatably through the base. The head is formed with a laterally drilled port 25 communicating with the interior shank portion 24 through which liquid is discharged onto the windshield. For turning the nozzle to change the angle of the liquid stream, the outer end of the head is preferably formed with a screw driver slot 26 by means of which the nozzle can easily and accurately be turned.

To hold the nozzle shank portion in the base for free rotation therein, the inner end of the shank portion is enlarged, as shown at 27. Preferably the shank portion is extended through the base and is made to be slightly longer than the base which may terminate in a tapered shoulder at its inner end, as shown in Figure 5. After assembly of the nozzle in the base, the inner end of the shank portion is flared to fit against the annular shoulder at the inner end of the base thereby to hold the nozzle against outward movement in the base and to secure the nozzle tightly in the base against liquid leakage. With this type of assembly, the nozzle can turn in the base to any desired angle to direct the stream of cleaning liquid properly onto the windshield, but there will be sufficient friction between the base and the nozzle to hold the nozzle accurately adjusted against accidental displacement.

It will be seen that the nozzle structure of the present invention can be manufactured and assembled very simply and inexpensively. When installed on a vehicle with the nozzles lying in the position shown in Figure 2, cleaning liquid will be accurately directed on the windshield in the paths of movement of the usual windshield wipers so that the windshield will be cleaned. Preferably, in the completed installation, as shown in Figures 1 and 2, the nozzle support is enclosed in a decorative cover to improve the appearance of the unit. This, however, will not conflict with proper adjustment of the nozzles themselves which project through cut-away portions of the cover.

While one embodiment of the invention has been shown and described herein, it will be understood that it is illustrative only and not to be taken as a definition of the scope of the invention, reference being had for this purpose to the appended claims.

What is claimed is:

1. A windshield washer nozzle comprising a hollow nozzle support adapted to be mounted on an automobile adjacent to the windshield thereof, said support having an elongated tubular shank and a hollow head communicating with the shank and formed with an opening in one side, a tubular base secured in the opening in the support and communicating with the interior thereof, the base terminating at its inner end in an annular inwardly facing shoulder, and a tubular nozzle having an integral enlarged head fitting against the outer end of the base and formed with a lateral discharge port and a cylindrical shank extending rotatably through the base, the inner end of the shank being enlarged and seating tightly against the annular shoulder to hold the nozzle in the base and frictionally to resist rotation thereof relative to the base.

2. The construction of claim 1 in which the nozzle head is circular in section and is formed in its outer end with a screw driver slot by which it can be turned.

References Cited in the file of this patent

UNITED STATES PATENTS

| | | |
|---|---|---|
| 2,114,558 | Dismukes | Apr. 19, 1938 |
| 2,501,912 | Parker | Mar. 28, 1950 |
| 2,507,668 | Hamilton | May 16, 1950 |
| 2,611,645 | Forman | Sept. 23, 1952 |
| 2,622,929 | Neufeld | Dec. 23, 1952 |

FOREIGN PATENTS

| | | |
|---|---|---|
| 10,598 | Switzerland | of 1895 |